United States Patent [19]
Hambrick

[11] Patent Number: 5,205,447
[45] Date of Patent: Apr. 27, 1993

[54] CAR TELEPHONE COVER APPARATUS

[76] Inventor: Kathleen D. Hambrick, 410 Link Dr., Alcoa, Tenn. 37701

[21] Appl. No.: 808,233

[22] Filed: Dec. 16, 1991

[51] Int. Cl.⁵ .......................................... B60R 11/02
[52] U.S. Cl. ............................. 224/42.42; 224/282; 224/311; 224/42.44; 242/67.3 R
[58] Field of Search ............... 224/42.42, 42.43, 42.44, 224/42.46 R, 42.32, 282, 311, 67.3 R; 379/428, 440, 451

[56] References Cited

U.S. PATENT DOCUMENTS

| 4,277,033 | 7/1981 | Swenson | 242/67.3 R |
| 4,611,734 | 9/1986 | Luecking et al. | 224/42.42 |
| 4,640,542 | 2/1987 | Watjer et al. | 224/42.42 X |
| 4,974,765 | 12/1990 | Marchetto et al. | 224/42.42 X |
| 5,111,360 | 5/1992 | Baba | 379/428 X |

FOREIGN PATENT DOCUMENTS

| 0301480 | 2/1989 | European Pat. Off. | 379/428 |
| 3700614 | 7/1988 | Fed. Rep. of Germany | 224/42.42 |
| 3741830 | 6/1989 | Fed. Rep. of Germany | 224/42.42 |
| 0170646 | 10/1983 | Japan | 224/42.42 |
| 0186749 | 10/1984 | Japan | 379/428 |
| 0135844 | 5/1990 | Japan | 379/428 |

Primary Examiner—Allan N. Shoap
Assistant Examiner—Paul A. Schwarz
Attorney, Agent, or Firm—Leon Gilden

[57] ABSTRACT

An apparatus for effecting the protection and concealment of a vehicular telephone is arranged for mounting to cover the telephone and receive the same therewithin and securement of the associated container upon a console or alternatively, provision is made for the mounting of the container from a telescoping mount selectively securable relative to a roof portion of an associated vehicle to utilize available space within a passenger compartment of an associated vehicle.

2 Claims, 4 Drawing Sheets

CAR TELEPHONE COVER APPARATUS

BACKGROUND OF THE INVENTION

1. Field of the Invention

The field of invention relates to telephone apparatus, and more particularly pertains to a new and improved car telephone cover apparatus wherein the same is arranged for the covering, concealment and protection of a telephone within a vehicle.

2. Description of the Prior Art

Concealment of various components, as well as affording protection to various components such as cameras and the like, is utilized in the prior art. The U.S. Pat. No. 4,138,045 to Baker sets forth a camera case of a unitary construction to afford protection to an associated camera therewithin.

U.S. Pat. No. 4,901,852 to King sets forth a cover for an electronic pager as utilized in association with telephone equipment.

U.S. Pat. No. 4,896,805 to Claczak, et al. sets forth a further example of a telephone pager covering container.

Accordingly, it may be appreciated that there continues to be a need for a new and improved car telephone cover apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of telephone apparatus now present in the prior art, the present invention provides a car telephone cover apparatus wherein the same effects concealment and protection relative to a vehicular telephone. As such, the general purpose of the present invention, which will be described subsequently in greater detail, is to provide a new and improved car telephone cover apparatus which has all the advantages of the prior art telephone apparatus and none of the disadvantages.

To attain this, the present invention provides an apparatus for effecting the protection and concealment of a vehicular telephone arranged for mounting to cover the telephone and receive the same therewithin and alternatively, provision is made for the mounting of the container from a telescoping mount selectively securable relative to a roof portion of an associated vehicle to utilize available space within a passenger compartment of an associated vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved car telephone cover apparatus which has all the advantages of the prior art telephone apparatus and none of the disadvantages.

It is another object of the present invention to provide a new and improved car telephone cover apparatus which may be easily and efficiently manufactured and marketed.

It is a further object of the present invention to provide a new and improved car telephone cover apparatus which is of a durable and reliable construction.

An even further object of the present invention is to provide a new and improved car telephone cover apparatus which is susceptible of a low cost of manufacture with regard to both materials and labor, and which accordingly is then susceptible of low prices of sale to the consuming public, thereby making such car telephone cover apparatus economically available to the buying public.

Still yet another object of the present invention is to provide a new and improved car telephone cover apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
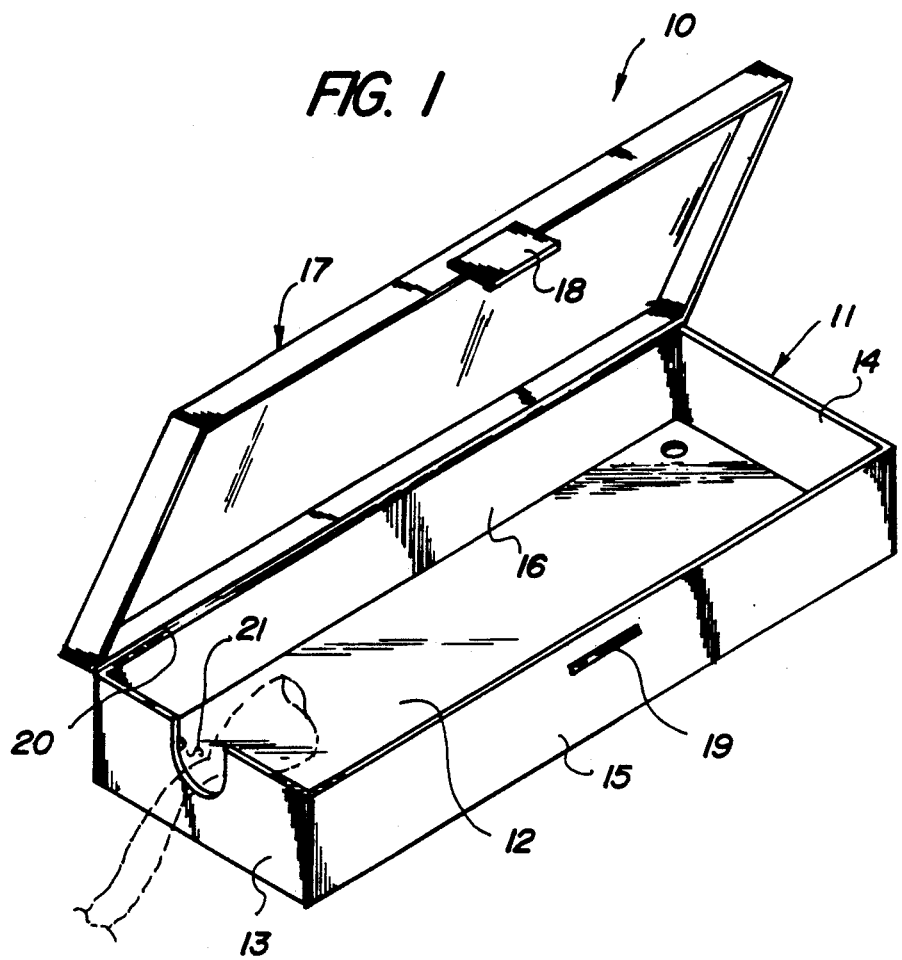
FIG. 1 is an isometric illustration of a cover housing as utilized by the invention.
Figure 2:
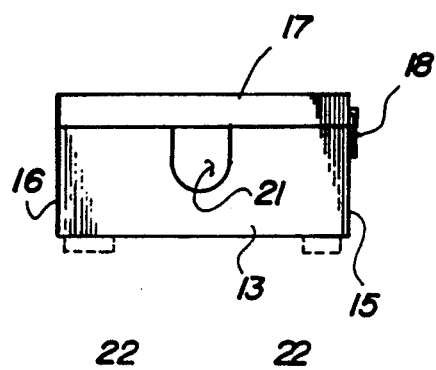
FIG. 2 is an orthographic end view of the cover housing.
Figure 3:
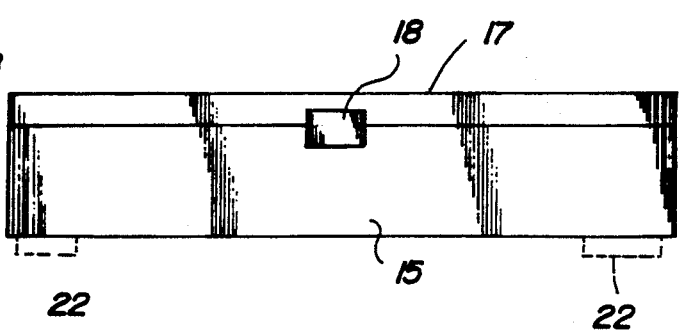
FIG. 3 is an orthographic frontal view of the cover housing.

With reference now to the drawings, and in particular to FIGS. 1 to 9 thereof, a new and improved car telephone cover apparatus embodying the principles and concepts of the present invention and generally designated by the reference numerals 10 and 10a will be described.

More specifically, the car telephone cover apparatus 10 of the instant invention essentially comprises the use of a container 11 that includes a container floor 12, a first wall 13 spaced from and parallel a second wall 14, and a front wall 15 spaced from and parallel a rear wall 16. A cover 17 is hingedly mounted to the rear wall 16 about a cover hinge 20. A front wall latch 18 is securable to a front wall receiving boss 19 to effect securement of the cover relative to the container portion of the construction. Further, the use of hook and loop fastener patches 22 may be optionally employed and secured to the floor 12 for adherence to accompanying patches to permit the organization to be mounted to a console or the like of a vehicle. It should be noted that a first end wall slot 21 is directed to the first end wall permitting projecting of the telephone cord of the associated telephone "T" to be received therethrough.

Figure 4:
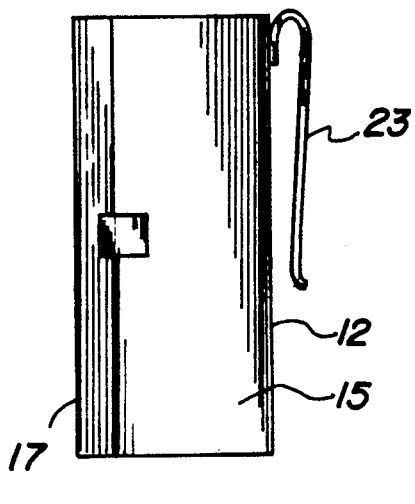
FIG. 4 is an orthographic end view of the cover housing utilizing the illustration of a mounting clip.
Figure 5:
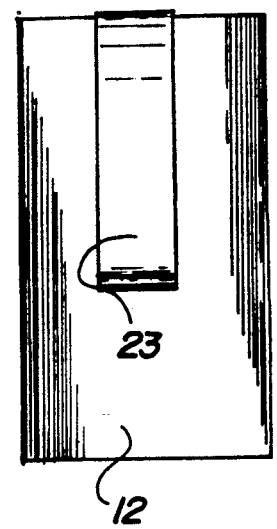
FIG. 5 is an orthographic rear view of the housing as set forth in FIG. 4.
Figure 6:
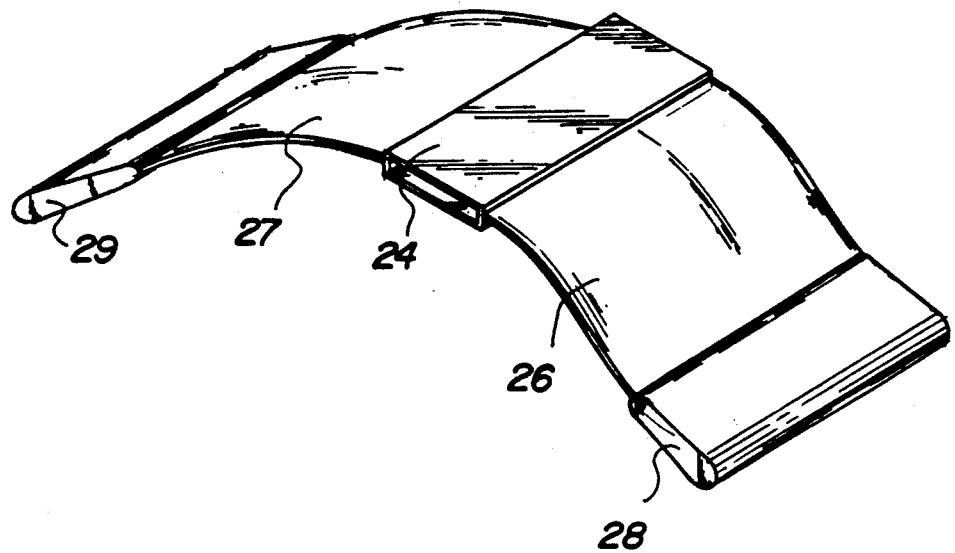
FIG. 6 is an isometric illustration of a support mounted for securing the cover housing of the FIGS. 4 and 5 relative to a vehicular transmission tunnel.

The FIGS. 4–6 illustrate the invention employing a spring clasp leg plate 23 mounted to the floor 12 for reception within a receiving tube 24. The receiving tube 24 includes a first flexible web 25 and a second flexible web 27 mounted to opposing side walls of the tube, with remote distal ends of the first and second webs including respective first and second weighted anchor plates 27 and 29 when a console is not available in a vehicle and the tube 24 is accordingly positioned upon a transmission tunnel portion of the vehicle. The organization is further adaptable for flush mounting to a floor in the event of a front wheel drive vehicle as is available in contemporary vehicular construction.

Figure 7:
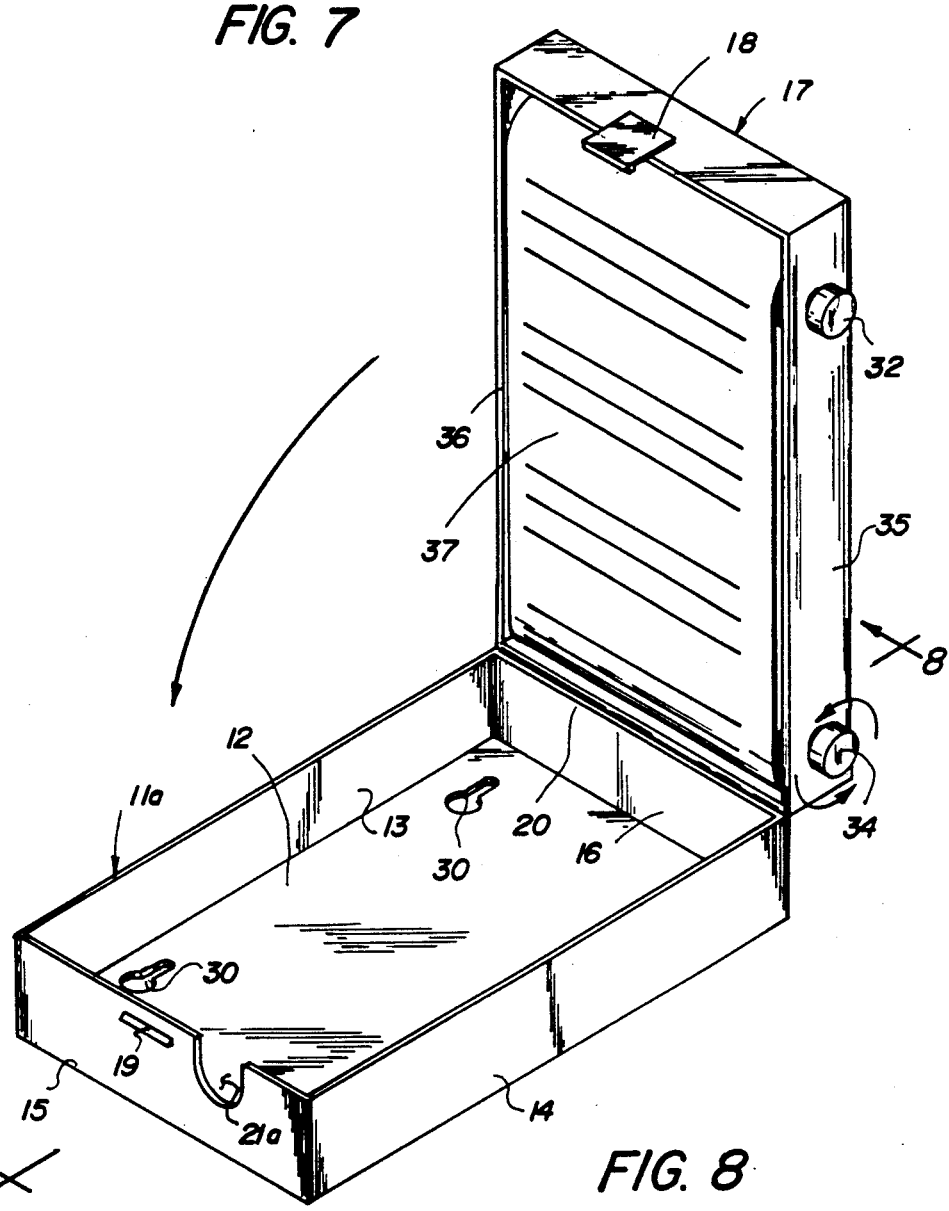
FIG. 7 is an isometric illustration of a modification of the invention.
Figure 8:
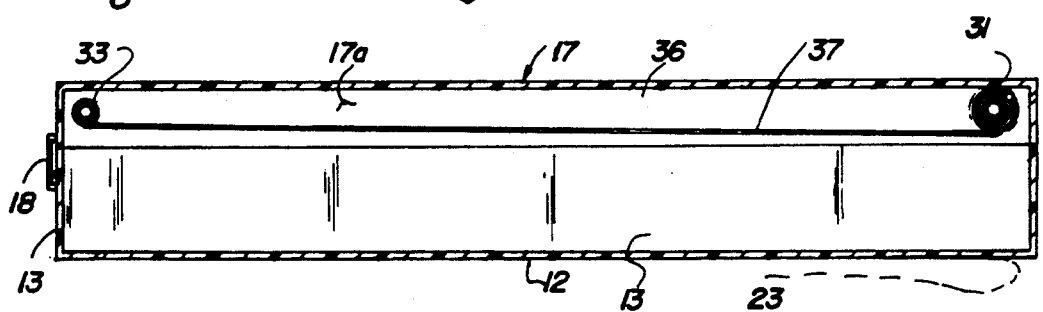
FIG. 8 is an orthographic view, taken along the lines 8—8 of FIG. 7 in the direction indicated by the arrows.
Figure 9:
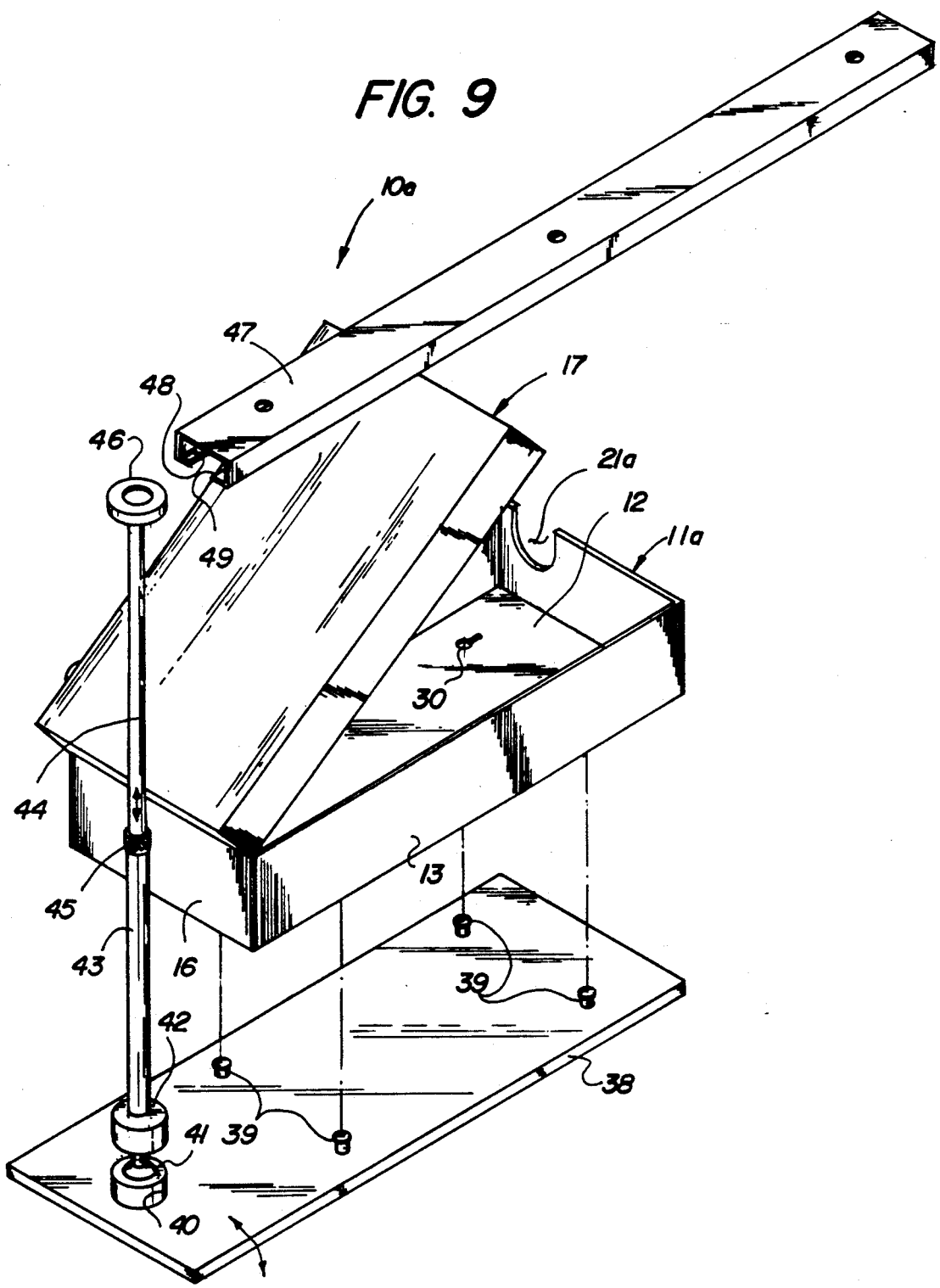
FIG. 9 is an isometric illustration of the modified cover housing apparatus of the invention.

The apparatus 10a, as illustrated in the FIGS. 7–9, includes the front wall 15 formed with a front wall slot 21a to receive the telephone cord of the telephone "T" therethrough. A plurality of spaced keyhole openings 30 are directed through the planar floor 12. The lid 17 includes a lid cavity 17a defined by lid side walls of a lid first side wall 35 and a lid second side wall 36 in a parallel relationship. A first axle 31 is spaced from and parallel a second axle 33 that are orthogonally and rotatably mounted through the first and second side walls in a parallel relationship and the first and second axles 31 and 33 include respective first and second handle 32 and 34 to effect selective rotation of the axles. The axles include an elongate web 37 whose first and second ends are selectively wound about the first and second axles 31 and 33. The web is arranged to receive various telephone information, such as numbers, addresses, and the like, in association with a telephone contained within the associated container 11a. A container mounting plate 38 includes a plurality of plate lug projections 39, with a lug projection arranged for reception within an associated keyhole opening 30 through the floor 12 for selective mounting of the container 11a to the plate 38. A support socket 40 mounted to a forward distal end of the plate 38 includes a pivot sphere 41 rotatably contained therewithin, wherein the pivot sphere includes a support boss 42 mounted fixedly to the pivot sphere, with a telescoping rod 44 integrally mounted to the support boss 42. A telescoping rod 44 is slidably and selectively received within the support tube 43, with a tube collet 45 mounted to an upper distal end of the telescoping rod 44 for selective securement of the telescoping rod 44 within the support tube 43. An upper distal end of the telescoping rod 44 includes a disc plate 46 that in turn is slidably received within a mounting tube 47. The mounting tube 47 is arranged for securement relative to a roof portion of an associated automotive vehicle, as well as to a dash board depending upon available room within a passenger compartment of that vehicle. The mounting tube 47 includes a "T" shaped cavity 48 directed coextensively through the mounting tube 47 accessed by the disc plate 47 and the associated support rod 43 by a mounting tube bottom wall slot 49 directed coextensively through the bottom wall of the mounting tube 47 directed into the cavity 48. In this manner, the support tube 43, telescoping rod 44, and the associated mounting plate and container 11a are arranged for adjustment along the mounting tube 47. Further, the modified container 11a is arranged for pivotal mounting as the mounting plate 38 is arranged for pivotment relative to the support tube 43 by the pivot sphere 41 mounted within the support socket 40 in a rotative manner.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car telephone cover apparatus, comprising,
    a container, the container including a container floor, with a first end wall spaced from a second end wall, and a front wall spaced from a rear wall, and a cover pivotally mounted to the rear wall, with the cover including a latch, and the front wall including a front wall receiving boss for selective securement of the latch thereto, and the cover including a cover first side wall spaced from and parallel a cover second side wall defining a cover cavity therebetween, and the front wall including a front wall slot directed downwardly from the front wall to receive a telephone cord therethrough, and securement means mounted to the floor for securement of the container to an underlying support, and the securement means includes a plurality of keyhole apertures directed through the floor spaced apart a predetermined spacing, and the support including a mounting plate, the mounting plate including a plurality of lug projections projecting upwardly and orthogonally relative to the mounting plate, wherein the lug projections are spaced apart the predetermined spacing for projection through the keyhole openings, and a first axle directed orthogonally through the cover first side wall and through the second side wall in a rotatable relationship, and a second axle rotatably and orthogonally directed through the cover first side wall and the cover second side wall, wherein the first axle is arranged parallel and spaced from the second axle, and a first axle handle mounted to the first axle positioned exteriorly of the first side wall, and a second axle handle mounted fixedly to the second axle projecting exteriorly relative to the first side wall, and the first axle and the second axle include an elongate flexible web wound between the first axle and the second axle to permit scrolling of the elongate web relative to the first axle and the second axle within the cavity.

2. An apparatus as set forth in claim 1 wherein the mounting plate includes a support socket fixedly mounted to a top surface of the mounting plate spaced from the lug projections, and a pivot sphere rotatably mounted within the support socket encaptured therewithin, and the pivot sphere including a support boss fixedly mounted to the pivot sphere, and the support boss including a support tube fixedly and orthogonally mounted relative to the support boss extending upwardly thereof, and the support tube including a tube collet mounted to an upper distal end of the support tube, and a telescoping rod slidably mounted within the support tube, with the tube collet arranged for arresting the telescoping rod relative to the support tube, and a disc plate mounted to an upper distal end of the support tube, and a mounting tube arranged for securement within an automotive environment, wherein the mounting tube includes a "T" shaped tube cavity, and the mounting tube includes a mounting tube bottom wall and a mounting tube bottom wall slot arranged coextensively through the mounting tube floor is arranged for projection into the "T" shaped cavity, wherein the "T" shaped cavity is arranged coextensively with the mounting tube and with the bottom wall slot, with the disc plate slidably received within the tube cavity through the bottom wall slot.

* * * * *